(12) United States Patent
Chand

(10) Patent No.: US 7,660,638 B2
(45) Date of Patent: Feb. 9, 2010

(54) BUSINESS PROCESS EXECUTION ENGINE

(75) Inventor: Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 50 days.

(21) Appl. No.: 11/239,889

(22) Filed: Sep. 30, 2005

(65) Prior Publication Data

US 2007/0078525 A1 Apr. 5, 2007

(51) Int. Cl.
G05B 19/18 (2006.01)
G05B 11/01 (2006.01)
G05B 15/02 (2006.01)
G05B 19/42 (2006.01)

(52) U.S. Cl. .............. 700/23; 700/2; 700/3; 700/8; 700/9; 700/11; 700/18; 700/20; 700/86

(58) Field of Classification Search .......... 700/18, 700/86, 23, 3, 8, 9, 2, 11, 20
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,858,101 A * | 8/1989 | Stewart et al. | 700/2 |
| 4,876,664 A * | 10/1989 | Bittorf et al. | 700/2 |
| 4,990,838 A | 2/1991 | Kawato et al. | |
| 5,072,374 A | 12/1991 | Sexton et al. | |
| 5,185,708 A | 2/1993 | Hall et al. | |
| 5,193,189 A * | 3/1993 | Flood et al. | 718/103 |
| 5,253,184 A | 10/1993 | Kleinschnitz | |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |
| 5,572,731 A | 11/1996 | Morel et al. | |
| 5,611,059 A | 3/1997 | Benton et al. | |
| 5,619,724 A | 4/1997 | Moore | |
| 5,634,048 A | 5/1997 | Ryu et al. | |
| 5,644,740 A | 7/1997 | Kiuchi | |
| 5,675,748 A | 10/1997 | Ross | |
| 5,708,828 A * | 1/1998 | Coleman | 715/523 |
| 5,715,413 A | 2/1998 | Ishai et al. | |
| 5,721,905 A | 2/1998 | Elixmann et al. | |
| 5,761,499 A | 6/1998 | Sondregger | |

(Continued)

OTHER PUBLICATIONS

Pitzek et al., Configuration and Management of a Real-Time Smart Transducer Network, 2003 IEEE, 2003, 4 pages.

(Continued)

*Primary Examiner*—Ronald D Hartman, Jr.
(74) *Attorney, Agent, or Firm*—Turocy & Watson LLP; William R. Walbrun; John M. Miller

(57) ABSTRACT

The claimed subject matter provides a controller that facilitates implementing a workflow within an industrial automation environment system. An interface component can facilitate the receipt of data associated with a workflow at the programmable logic controller. A controller communicatively coupled to the interface component incorporates an execution engine that can execute the workflow and allow a seamless data flow between applications to provide at least one service.

28 Claims, 11 Drawing Sheets

U.S. PATENT DOCUMENTS

| | | | |
|---|---|---|---|
| 5,797,137 A | 8/1998 | Golshani et al. | |
| 5,812,773 A | 9/1998 | Norin | |
| 5,828,851 A | 10/1998 | Nixon et al. | |
| 5,832,486 A | 11/1998 | Itoh et al. | |
| 5,838,563 A | 11/1998 | Dove et al. | |
| 5,848,273 A | 12/1998 | Fontana et al. | |
| 5,862,052 A | 1/1999 | Nixon et al. | |
| 5,884,025 A | 3/1999 | Baehr et al. | |
| 5,884,033 A | 3/1999 | Duvall et al. | |
| 5,913,029 A | 6/1999 | Shostak | |
| 5,924,094 A | 7/1999 | Sutter | |
| 5,936,539 A | 8/1999 | Fuchs | |
| 5,940,294 A | 8/1999 | Dove | |
| 5,940,854 A | 8/1999 | Green, Jr. et al. | |
| 5,951,440 A | 9/1999 | Reichlinger | |
| 5,960,420 A | 9/1999 | Leymann et al. | |
| 5,966,705 A | 10/1999 | Koneru | |
| 5,978,577 A | 11/1999 | Rierden et al. | |
| 5,980,078 A | 11/1999 | Krivoshein et al. | |
| 5,983,016 A | 11/1999 | Brodsky et al. | |
| 6,011,899 A | 1/2000 | Ohishi et al. | |
| 6,032,208 A | 2/2000 | Nixon et al. | |
| 6,044,217 A | 3/2000 | Brealey et al. | |
| 6,063,129 A | 5/2000 | Dadd et al. | |
| 6,070,214 A * | 5/2000 | Ahern | 710/315 |
| 6,081,899 A | 6/2000 | Byrd | |
| 6,098,116 A | 8/2000 | Nixon et al. | |
| 6,101,531 A | 8/2000 | Eggleston et al. | |
| 6,195,591 B1 | 2/2001 | Nixon et al. | |
| 6,208,987 B1 | 3/2001 | Nihei | |
| 6,234,899 B1 | 5/2001 | Nulph | |
| 6,266,726 B1 | 7/2001 | Nixon et al. | |
| 6,275,977 B1 | 8/2001 | Nagai et al. | |
| 6,308,168 B1 | 10/2001 | Dovich et al. | |
| 6,308,224 B1 | 10/2001 | Leymann et al. | |
| 6,311,187 B1 | 10/2001 | Jeyaraman | |
| 6,327,511 B1 | 12/2001 | Naismith et al. | |
| 6,336,152 B1 | 1/2002 | Richman et al. | |
| 6,356,920 B1 | 3/2002 | Vandersluis | |
| 6,377,957 B1 | 4/2002 | Jeyaraman | |
| 6,393,566 B1 | 5/2002 | Levine | |
| 6,398,106 B1 | 6/2002 | Ulvr et al. | |
| 6,409,082 B1 | 6/2002 | Davis et al. | |
| 6,411,987 B1 | 6/2002 | Steger et al. | |
| 6,415,983 B1 | 7/2002 | Ulvr et al. | |
| 6,418,494 B1 * | 7/2002 | Shatas et al. | 710/305 |
| 6,425,051 B1 | 7/2002 | Burton et al. | |
| 6,438,744 B2 | 8/2002 | Toutonghi et al. | |
| 6,445,963 B1 | 9/2002 | Blevins et al. | |
| 6,446,202 B1 | 9/2002 | Krivoshein et al. | |
| 6,457,053 B1 | 9/2002 | Satagopan et al. | |
| 6,469,986 B1 | 10/2002 | Lecheler et al. | |
| 6,473,656 B1 | 10/2002 | Langels et al. | |
| 6,484,061 B2 | 11/2002 | Papadopoulos et al. | |
| 6,501,996 B1 | 12/2002 | Bieber | |
| 6,505,247 B1 | 1/2003 | Steger et al. | |
| 6,510,352 B1 | 1/2003 | Badavas et al. | |
| 6,539,271 B2 | 3/2003 | Lech et al. | |
| 6,539,430 B1 | 3/2003 | Humes | |
| 6,539,458 B2 | 3/2003 | Holmberg | |
| 6,578,101 B1 * | 6/2003 | Ahern | 710/306 |
| 6,631,519 B1 | 10/2003 | Nicholson et al. | |
| 6,643,555 B1 | 11/2003 | Eller et al. | |
| 6,661,426 B1 | 12/2003 | Jetha et al. | |
| 6,664,981 B2 | 12/2003 | Ashe et al. | |
| 6,681,227 B1 | 1/2004 | Kojima et al. | |
| 6,687,817 B1 | 2/2004 | Paul | |
| 6,697,797 B1 | 2/2004 | Hoggatt et al. | |
| 6,704,746 B2 | 3/2004 | Sokolov et al. | |
| 6,714,949 B1 | 3/2004 | Frey, Jr. | |
| 6,714,981 B1 | 3/2004 | Skaggs | |
| 6,738,821 B1 | 5/2004 | Wilson et al. | |
| 6,745,089 B2 | 6/2004 | Rasmussen et al. | |
| 6,745,254 B2 * | 6/2004 | Boggs et al. | 710/11 |
| 6,748,486 B2 | 6/2004 | Burton et al. | |
| 6,751,634 B1 | 6/2004 | Judd | |
| 6,758,403 B1 | 7/2004 | Keys et al. | |
| 6,760,721 B1 | 7/2004 | Chasen et al. | |
| 6,760,732 B2 | 7/2004 | Busshart et al. | |
| 6,763,395 B1 | 7/2004 | Austin | |
| 6,766,312 B2 | 7/2004 | Landt | |
| 6,769,095 B1 | 7/2004 | Brassard et al. | |
| 6,778,537 B1 | 8/2004 | Ishibashi | |
| 6,792,337 B2 * | 9/2004 | Blackett et al. | 700/295 |
| 6,801,822 B1 | 10/2004 | Fujiwara et al. | |
| 6,807,632 B1 | 10/2004 | Carpentier et al. | |
| 6,807,639 B2 * | 10/2004 | Shatas et al. | 713/400 |
| 6,809,732 B2 | 10/2004 | Zatz et al. | |
| 6,836,892 B2 | 12/2004 | Ikoma et al. | |
| 6,839,790 B2 | 1/2005 | Barros De Almeida et al. | |
| 6,842,769 B1 | 1/2005 | Kim et al. | |
| 6,853,920 B2 | 2/2005 | Hsiung et al. | |
| 6,865,509 B1 | 3/2005 | Hsiung et al. | |
| 6,868,413 B1 | 3/2005 | Grindrod et al. | |
| 6,874,145 B1 | 3/2005 | Ye et al. | |
| 6,874,146 B1 | 3/2005 | Iyengar | |
| 6,880,060 B2 | 4/2005 | Talagala et al. | |
| 6,889,282 B2 | 5/2005 | Schollenberger | |
| 6,901,578 B1 | 5/2005 | Beaven et al. | |
| 6,904,473 B1 | 6/2005 | Bloxham et al. | |
| 6,920,474 B2 | 7/2005 | Walsh et al. | |
| 6,928,521 B1 | 8/2005 | Burton et al. | |
| 6,930,985 B1 | 8/2005 | Rathi et al. | |
| 6,934,749 B1 | 8/2005 | Black et al. | |
| 6,938,079 B1 | 8/2005 | Anderson et al. | |
| 6,944,626 B2 | 9/2005 | Cameron et al. | |
| 6,947,947 B2 | 9/2005 | Block et al. | |
| 6,950,900 B1 | 9/2005 | McKean et al. | |
| 6,954,770 B1 | 10/2005 | Carlson et al. | |
| 6,961,728 B2 | 11/2005 | Wynblatt et al. | |
| 6,973,556 B2 | 12/2005 | Milligan et al. | |
| 6,975,913 B2 | 12/2005 | Kreidler et al. | |
| 7,010,368 B2 * | 3/2006 | Otani et al. | 700/86 |
| 7,020,732 B2 * | 3/2006 | Shatas et al. | 710/306 |
| 2002/0012401 A1 | 1/2002 | Karolys et al. | |
| 2002/0013748 A1 | 1/2002 | Edmison et al. | |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0194577 A1 | 12/2002 | Connor et al. | |
| 2003/0014387 A1 | 1/2003 | Kreidler et al. | |
| 2003/0014500 A1 * | 1/2003 | Schleiss et al. | 709/218 |
| 2003/0065673 A1 | 4/2003 | Grobler et al. | |
| 2003/0090514 A1 | 5/2003 | Cole et al. | |
| 2003/0120710 A1 | 6/2003 | Pulsipher et al. | |
| 2003/0123467 A1 | 7/2003 | Du et al. | |
| 2003/0126308 A1 | 7/2003 | Kim | |
| 2003/0177114 A1 | 9/2003 | Lin et al. | |
| 2003/0212828 A1 | 11/2003 | Miyazaki et al. | |
| 2003/0218641 A1 | 11/2003 | Longobardi | |
| 2004/0006401 A1 | 1/2004 | Yamada et al. | |
| 2004/0024995 A1 | 2/2004 | Swaine | |
| 2004/0044421 A1 | 3/2004 | Brune et al. | |
| 2004/0073565 A1 | 4/2004 | Kaufman et al. | |
| 2004/0098153 A1 | 5/2004 | Neudeck | |
| 2004/0167790 A1 | 8/2004 | Grasse | |
| 2004/0196855 A1 | 10/2004 | Davies et al. | |
| 2004/0199655 A1 | 10/2004 | Davies et al. | |
| 2004/0203620 A1 | 10/2004 | Thome et al. | |
| 2004/0210629 A1 | 10/2004 | Klindt et al. | |
| 2004/0249771 A1 | 12/2004 | Berg et al. | |
| 2004/0260591 A1 | 12/2004 | King | |

| | | |
|---|---|---|
| 2005/0005289 A1 | 1/2005 | Adolph et al. |
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0091510 A1* | 4/2005 | McKeon et al. ............ 713/185 |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0159828 A1* | 7/2005 | Deininger et al. ............ 700/87 |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0240675 A1* | 10/2005 | Caspers et al. ............ 709/230 |
| 2005/0251527 A1 | 11/2005 | Phillips et al. |
| 2005/0256788 A1 | 11/2005 | Mukai |
| 2005/0256964 A1* | 11/2005 | Dube ........................ 709/230 |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0149870 A1* | 7/2006 | Sears et al. .................... 710/71 |
| 2006/0224811 A1* | 10/2006 | Sichner et al. ............. 710/306 |
| 2006/0259154 A1* | 11/2006 | Hood et al. .................... 700/2 |
| 2006/0259160 A1* | 11/2006 | Hood et al. .................... 700/20 |
| 2007/0160081 A1* | 7/2007 | Logvinov et al. ........... 370/469 |

OTHER PUBLICATIONS

European Search Report dated Jun. 12, 2005 for European Patent Application Serial Number EP05016793, 3 pages.

John Kubiatowicz, et al. "OceanStore: An Architecture for Global-Scale Persistent Storage" ASPLOS 2000, Cambridge, Massachusetts (2000).

Roy Goldman, et al. "From Semistructured Data to XML: Migrating the Lore Data Model and Query Language" (1999).

* cited by examiner

BUSINESS PROCESS EXECUTION ENGINE

TECHNICAL FIELD

The subject invention relates to industrial control systems and, more particularly, to enabling utilization of legacy devices when updating an industrial control system data model.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

As can be discerned from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Furthermore, updating data structures of controllers is associated with another array of implementation problems. For instance, some legacy controllers or other devices may not be associated with sufficient memory and/or processing power to support an updated application, and it is not cost effective for a company to replace every controller within an enterprise. Therefore, not only will multiple copies of data be existent within an industrial automation environment, but multiple copies of disparately structured data will be existent upon a network. Applications may require disparate mapping modules to enable mapping between controllers associated with first and second architectures. Thus, simply updating an architecture of controllers does not alleviate current deficiencies associated with industrial controllers in an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate implementing a workflow within an industrial automation environment. A controller can incorporate an execution engine, wherein the execution engine can execute directly on such controller to enable seamless data flow between the controller and at least one application. The execution engine within the controller can program such workflow, wherein the workflow is. In other words, the execution engine allows adjustment and/or management of the flow of the sequence of such applications. Moreover, the controller can be related to a hierarchically structured data model. With the aid of a common hierarchically structured data model, the controller with incorporated execution engine can utilize software applications to synthesize data from an industrial automation environment (e.g., an enterprise, a site, a line, an area, a machine, etc.) and affect transactions and/or services. For instance, the transactions and/or services can be, but are not limited to, writing detailed process conditions, writing quality data associated with a batch of product to a database, logging computational errors associated with a process, tracking mechanical failure within a particular process, etc.

In accordance with one aspect of the claimed subject matter, the controller can include a map component that converts data received via the interface into a format according to the hierarchically structured data model. In other words, the map component formats data (e.g., programs, workflows, etc.) into accordance with a common data model that can be compatible with the controller. In one particular example, the common data model and/or hierarchical data model can be modeled after ISA_S88, ISAS95, and/or a combination thereof.

In accordance with another aspect of the claimed subject matter, the controller can include an Ethernet component that facilitates executing workflow. In one example, the Ethernet component can utilize a separate computer that executes the business process workflow engine and/or any other software programs to implement business processes. In accordance with another aspect of the innovation described herein, the controller can further include a bridge component that facilitates networking within the industrial automation environment. In other words, the bridge component can act as a network bridge. Thus, data carried by disparate networks can be manipulated so that it conforms to a common network. In other aspects of the claimed subject matter, methods are provided that facilitate implementing a workflow within an industrial automation environment.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
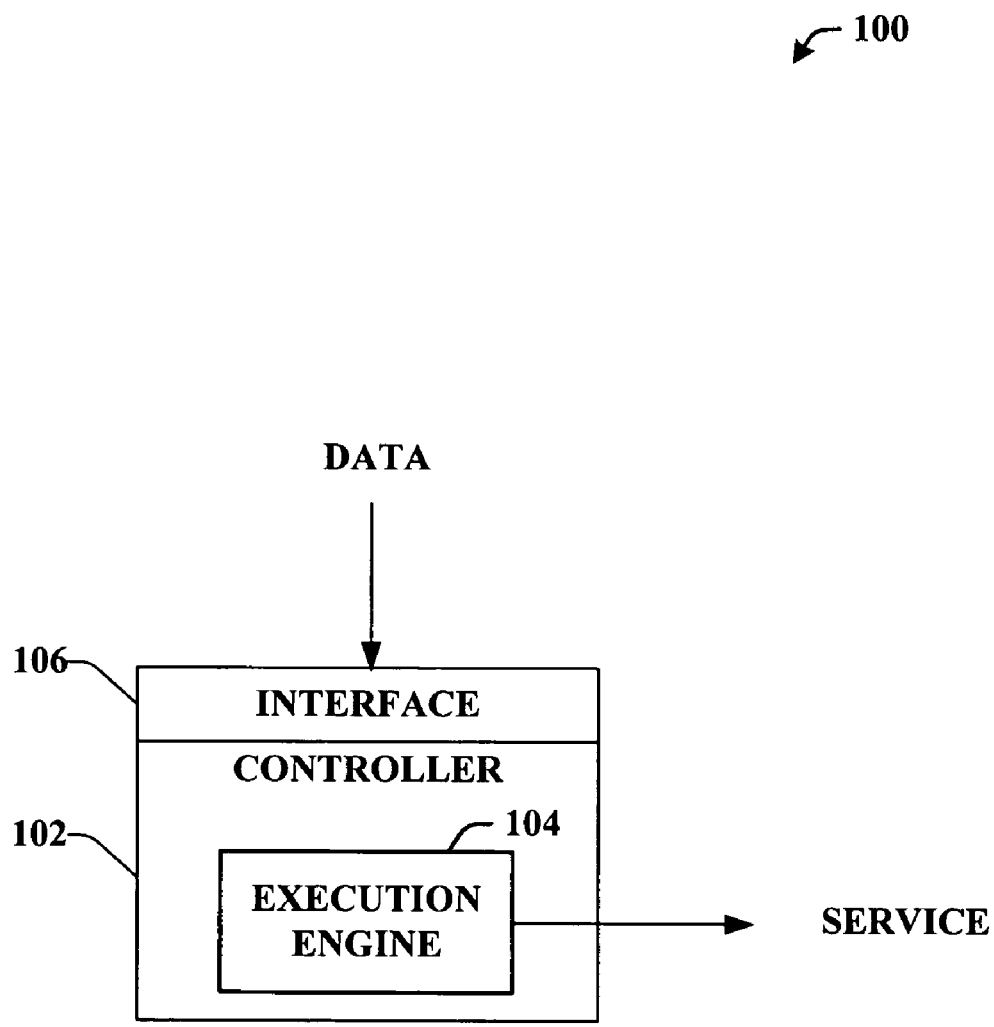
FIG. 1 illustrates a block diagram of an exemplary system that facilitates implementing a workflow within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates implementing a workflow within an industrial automation environment. A controller 102 can incorporate an execution engine 104 that can execute data received via an interface component 106 (discussed infra). The data received can relate to a program, a legacy program, a workflow, a business workflow, etc. such as, but not limited to business process execution language (BPEL), a programming language, any suitable workflow language, etc. The execution engine 104 can execute directly on the controller 102 to enable data flow between multiple software applications running on the controller 102. With the aid of a hierarchically structured data model, the controller 102 with incorporated execution engine 104 can utilize software applications to synthesize data from an industrial automation environment (e.g., a plant, a factory, a manufacturing facility, etc.) and affect transactions and/or services. For instance, the transactions and/or services can be, but are not limited to, writing detailed process conditions, writing quality data associated with a batch of product to a database, logging computational errors associated with a process, tracking mechanical failure within a particular process, etc.

It is to be appreciated that the controller can contain software components and hardware components having inputs and/or outputs that can be utilized in connection with automating an industrial manufacturing device/process. In addition, it is to be understood that the execution engine 104 can be incorporated into a plurality of controllers, and for the sake of brevity throughout the subject innovation, a single controller is depicted but the claimed subject matter is not so limited. Moreover, the controller 102 can be associated with the physical location hierarchy of an industrial automation environment (e.g., a plant, factory, manufacturing facility, etc.). The physical location hierarchy of an industrial automation environment can be based at least in part upon the hierarchically structured data model. In one particular example, the hierarchical data model can be modeled after ISA_S88, ISAS95, and/or a combination thereof. It is understood, however, that any manner of hierarchically configuring a factory can be utilized in connection with modeling.

For instance, the controller 102 can relate to the hierarchically structured data model that utilizes a naming convention, wherein the naming convention for a variable, a tag (e.g., an input and/or output of a PLC, including physical and virtual), and/or automation device can relate to a physical hierarchy of the industrial automation environment. For example, the physical hierarchy of the industrial automation environment can be indicative of a factory-level, a cell-level, a subcell level, input and outputs within each subcell, and the like. In one example, the physical hierarchy of the industrial automation environment can be enterprise, plant, site, cell, machine, automation device. For example, a first photo eye on controller 5, in cell A, in the Smithville Plant that is for packaging associated with a Chip Factory can be referenced as "Chip-Factory/Packaging/SmithvillePlant/CellA/Controller5/photoeye1." By utilizing such a naming convention, tags, names, and/or references need not be unique, programming can be more generalized, reused, code can be more descriptive as well as information derived from code.

Moreover, the system 100 can include any suitable and/or necessary interface component 106 (herein referred to as "interface 106"), which provides various adapters, connectors, channels, communication paths, etc. to integrate the controller 102 and integrated execution engine 104 into virtually any operating and/or database system(s). The interface 106 can receive data, wherein the data received can relate to a program, a legacy program, a workflow, a business workflow, etc. such as, but not limited to business process execution language (BPEL), a programming language, any suitable workflow language, etc. Such receipt of the data via the interface 106 allows the execution engine 104 to directly execute such workflow on the controller 102 to enable data flow between multiple software applications running on the controller 102. In addition, the interface component 106 can provide various adapters, connectors, channels, communication paths, etc., that provide for interaction with the controller 102 and/or execution engine 104.

Figure 2:
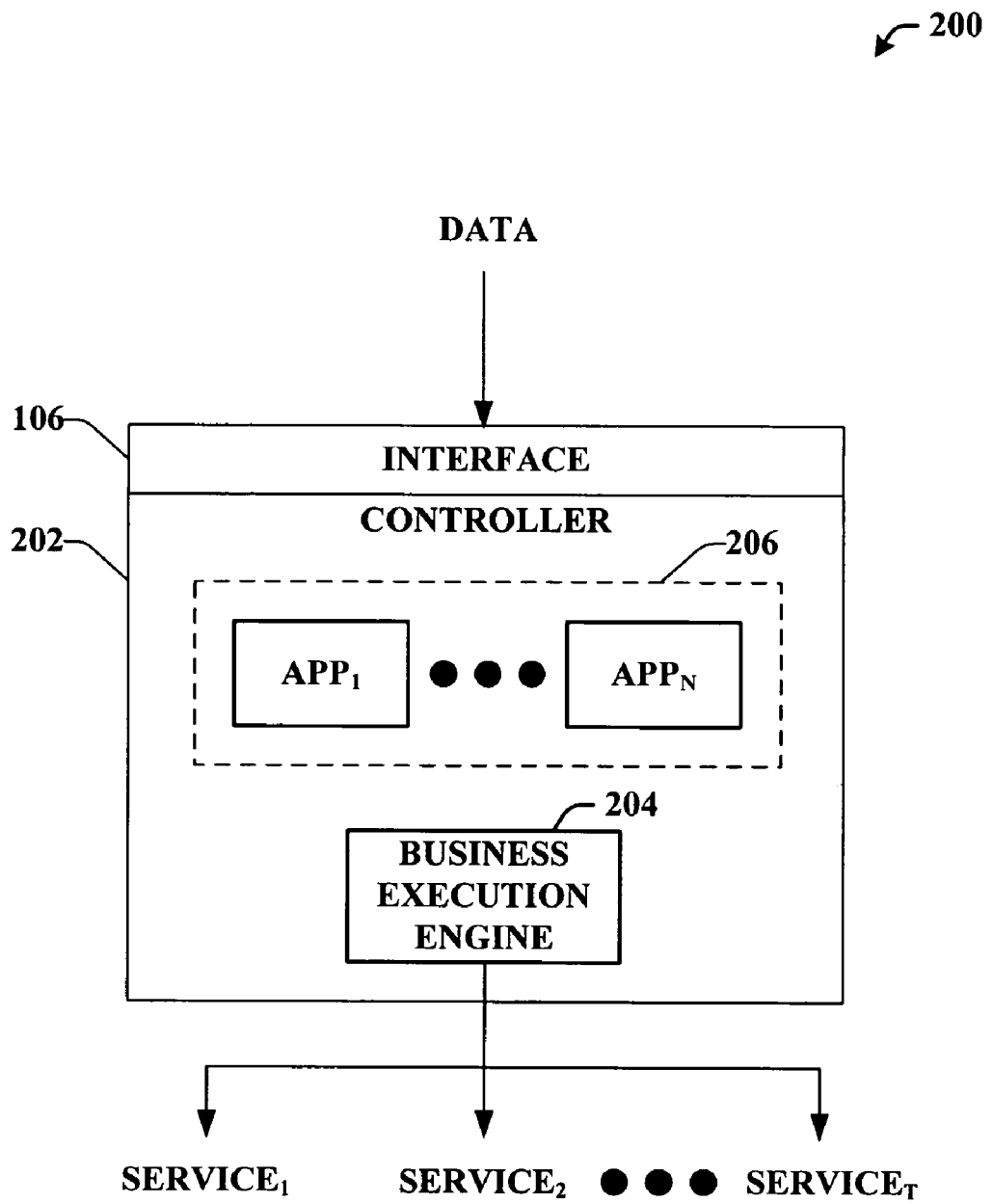
FIG. 2 illustrates a block diagram of an exemplary system that facilitates executing a business process workflow on a controller to enable data flow between multiple software applications to provide a plurality of services.

FIG. 2 illustrates a system 200 that facilitates a business process workflow on a controller to enable data flow between multiple software applications to provide a plurality of services. A controller 202 can incorporate a business execution engine 204 that enables seamless data flow between various applications 206. There can be any number of applications 206 such that App 1 to App N, where N is an integer greater than or equal to 1. For instance, an application can synthesize data from an industrial automation environment such as a plant, factory, manufacturing facility, etc. Moreover, the incorporation of the business execution engine 204 eliminates the requirement of various interfaces between such applications 206 to effectuate a business process workflow. It is to be appreciated and understood that the controller 202 and the business execution engine 204 can be substantially similar to the controller 102 and the execution engine 104 in FIG. 1. Moreover, the business execution engine 204 is not so limited to execute workflow associated with business processes and/or applications and any suitable application and/or process can be executed by such engine.

In one example, there can be any number of applications, wherein each application performs a certain operation (e.g., tracking a part, tracking a repair, tracing, genealogy, work orders, etc.). Each application can execute and generate an output that is dependent and/or utilized by a disparate application. For instance, if there are three applications, application one can execute and generate an output utilized by application two, wherein application two can execute and generate an output to application three, wherein application three can execute and generate an output to application one, and so on and so forth. This flow is referred to as a business workflow. The controller 202 incorporates the business execution engine 204 that programs such workflow. In other words, the business execution engine 204 allows adjustment and/or management of the flow of the sequence of such applications 206.

In addition, the business execution engine 204 can implement such business workflow to affect transactions and/or services. There can be a plurality of services such that service 1 to service T, where T is an integer greater than or equal to 1. The services can be, but are not limited to, writing detailed process conditions, writing quality data associated with a batch of product to a database, logging computational errors associated with a process, tracking mechanical failure within a particular process, etc. It is to be appreciated that the services and/or transactions can be any suitable services and/or transactions associated with the industrial automation environment and the above listing is not to be limiting on the subject innovation.

Figure 3:
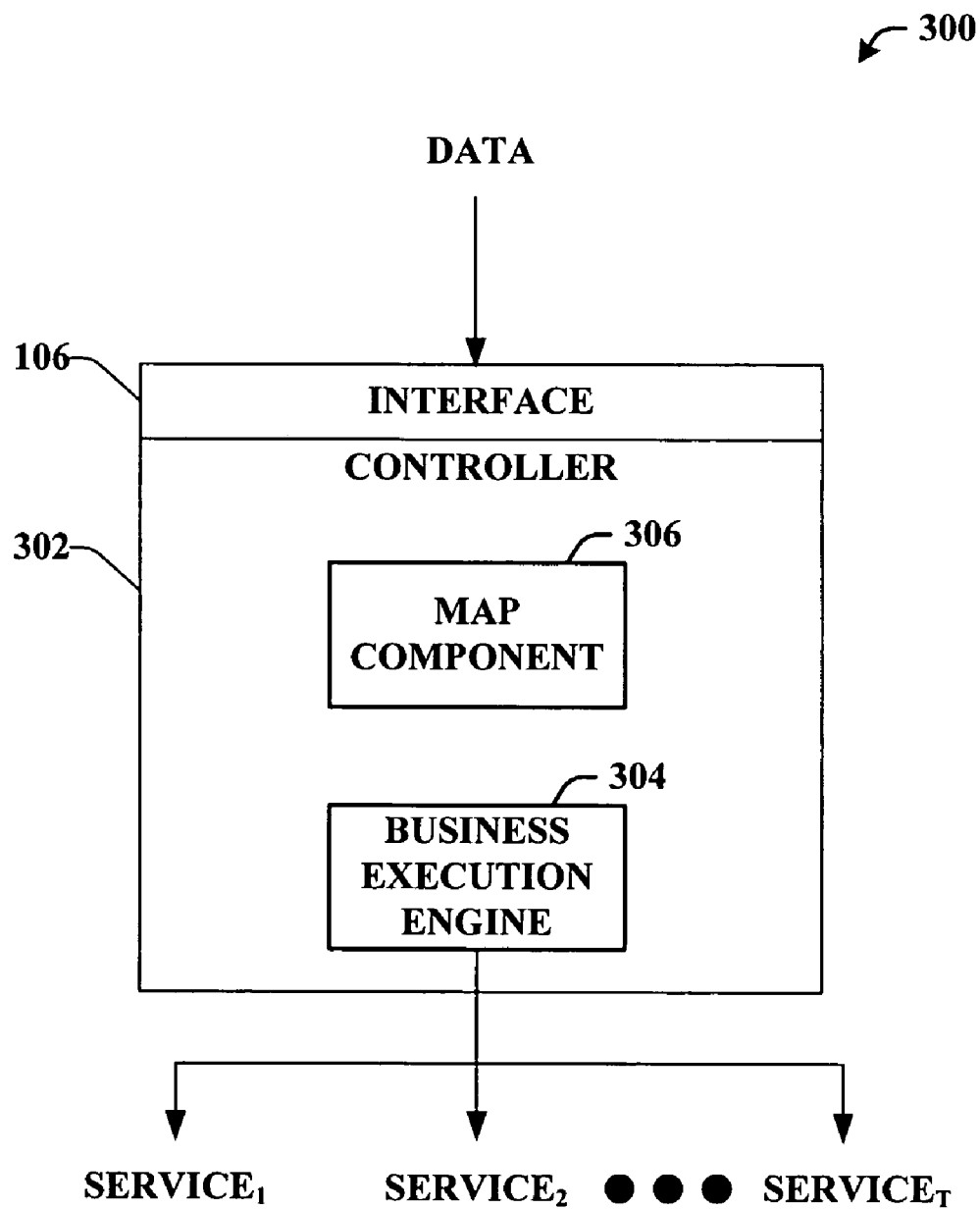
FIG. 3 illustrates a block diagram of an exemplary system that facilitates mapping a workflow to a hierarchically structured data model and implementing such workflow within an industrial automation environment.

FIG. 3 illustrates a system 300 that facilitates mapping a workflow to a hierarchically structured data model and implementing such workflow within an industrial automation environment. A controller 302 can integrate a business execution engine 304 to allow the seamless execution of any suitable workflow associated with the industrial automation environment. The controller 302 can contain software components and hardware components having inputs and/or outputs that can be utilized in connection with automating an industrial manufacturing device/process. In addition, the controller 302 can relate to a hierarchically structured data model that utilizes a naming convention, wherein the naming convention for a variable, a tag (e.g., an input and/or output of a PLC, including physical and virtual), and/or automation device can relate to a physical hierarchy of the industrial automation environment.

The business execution engine 304 can execute directly on the controller 302 to enable seamless data flow between multiple software applications running on the controller 302. With the aid of a common hierarchically structured data model (discussed supra), the controller 302 and incorporated business execution engine 304 can utilize applications to synthesize data from the industrial automation environment (e.g., a plant, a factory, a manufacturing facility, etc.) and affect transactions and/or services. There can be a plurality of services such that service 1 to service T, where T is an integer greater than or equal to 1. For instance, the transactions and/or services can be, but are not limited to, writing detailed process conditions, writing quality data associated with a batch of product to a database, logging computational errors associated with a process, tracking mechanical failure within a particular process, etc. It is to be appreciated that the controller 302 and the business execution engine 304 can be substantially similar to the controllers and engines described in previous figures.

The controller 302 can include a map component 306 that converts data received via the interface into a format according to the hierarchically structured data model. In other words, the map component 306 formats data (e.g., programs, workflows, Business Process Execution Language (BPEL), etc.) into accordance with a common data model that can be compatible with the controller 302. In one particular example, the common data model and/or hierarchical data model can be modeled after ISA_S88, ISAS95, and/or a combination thereof. It is understood, however, that any manner of hierarchically configuring a factory can be utilized in connection with modeling. By utilizing the map component 306, legacy data associated with legacy devices can be implemented in association with the controller 302 and the business execution engine 304 to seamlessly execute business workflow.

For instance, the business execution engine 304 can be implemented into a system that contains legacy devices, controllers, and the like that utilize computer instructions not related to the hierarchically structured data model and the naming convention based on the physical location within the industrial automation environment. Thus, the map component 306 can interpret and/or translate such legacy instructions such that the instructions can be compatible with the hierarchically structured data model. In another example, the map component 306 can provide reverse translation, wherein instructions related to the hierarchically structured data model can be interpreted into any suitable legacy instructions. Although depicted as incorporated into the controller 302, it is to be appreciated that the map component 306 can be a stand-alone component, incorporated into the controller 302, incorporated into the business execution engine 304, and/or any combination thereof.

For example, the interface 106 can receive data, wherein such data can be related to a legacy device. The map component 306 can convert the data to a format compatible with the controller 306 and the hierarchically structured data model. By converting such data, the map component 306 allows such data associated with legacy device to be utilized by the controller 302 and other controllers (not shown) compatible with the hierarchically structured data model. It is to be appreciated that the map component 306 can convert and/or format any suitable data received via the interface 106 into a format in accordance with the common data model and/or hierarchically structured data model that can be compatible with controllers formatted therewith.

Figure 4:
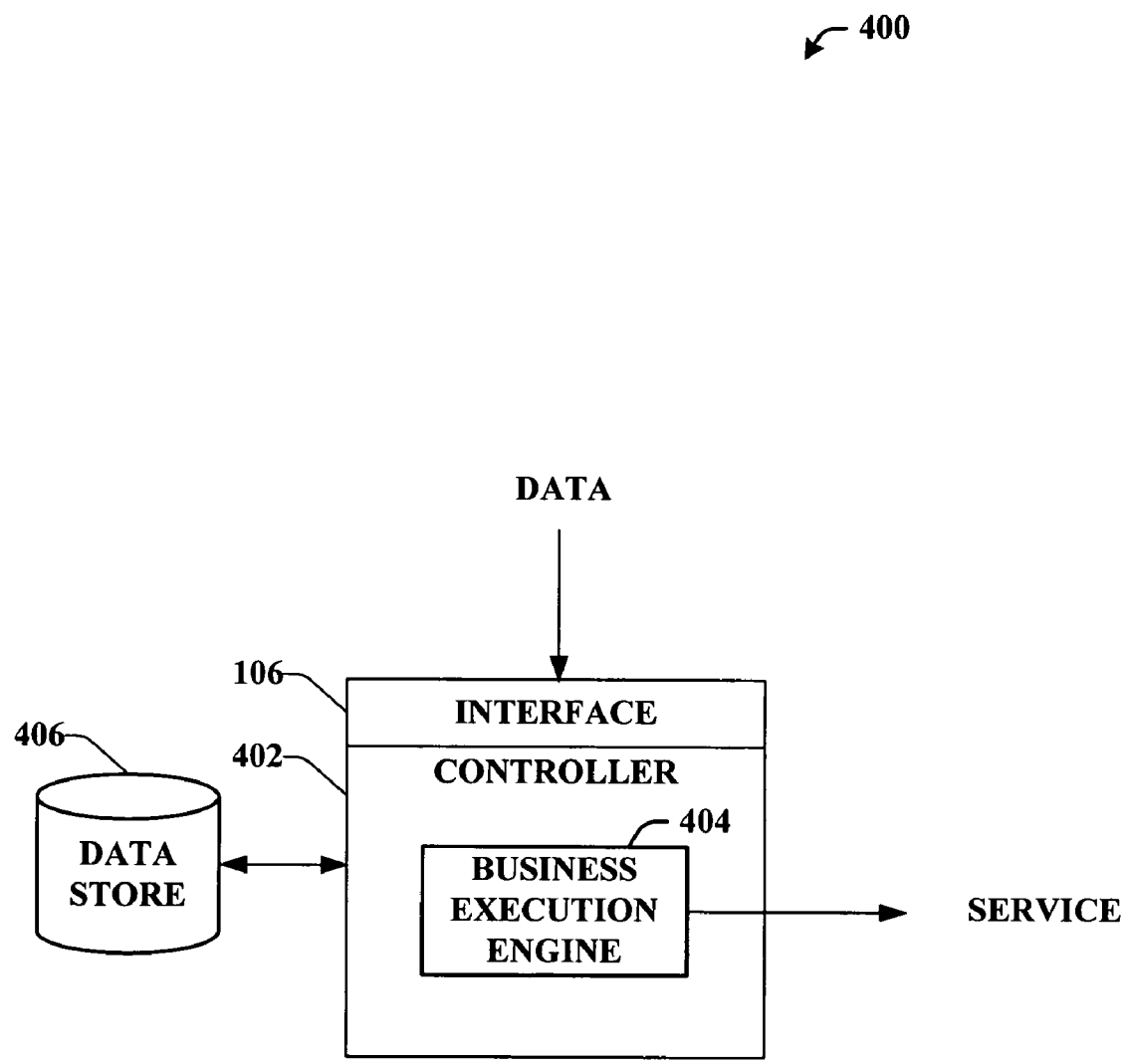
FIG. 4 illustrates a block diagram of an exemplary system that facilitates executing a business process workflow on a controller within an industrial automation environment to provide a service.

FIG. 4 illustrates a system 400 that facilitates executing a business process workflow on a controller within an industrial automation environment to provide a service. A controller 402 can incorporate a business execution engine 404 that can execute data received via an interface component 106 (discussed supra). The data received can relate to a program, a legacy program, workflow, a business workflow, etc. such as, but not limited to business process execution language (BPEL), a programming language, any suitable workflow language, etc. The business execution engine 404 can execute directly on the controller 402 to enable seamless data flow between multiple software applications running on the controller 402 and applications running outside the controller 402. With the aid of a hierarchically structured data model, the controller 402 with incorporated business execution engine 404 can utilize software applications to synthesize data from an industrial automation environment (e.g., a plant, a factory, a manufacturing facility, etc.) and affect transactions and/or services. It is to be appreciated that the controller 402 and the business execution engine 404 can be substantially similar to the controllers and engines described in previous figures.

The system 400 can utilize a data store 406 that can store applications, modules associated with a particular functionality and other workflows associated with the industrial automation environment. For example, the data store 406 can be accessible via the Internet, Ethernet, and/or any other suitable data communication technique. The data store 406 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 406 of the subject systems and methods is intended to comprise, without being limited to, these and any other suitable types of memory. In addition, it is to be appreciated that the data store 406 can be a server, a database, a hard drive, and the like. Moreover, it is to be appreciated that although the data store 406 is depicted as a stand-alone component, it can be incorporated into the controller 402, into the business execution engine 404, and/or any combination thereof.

Figure 5:
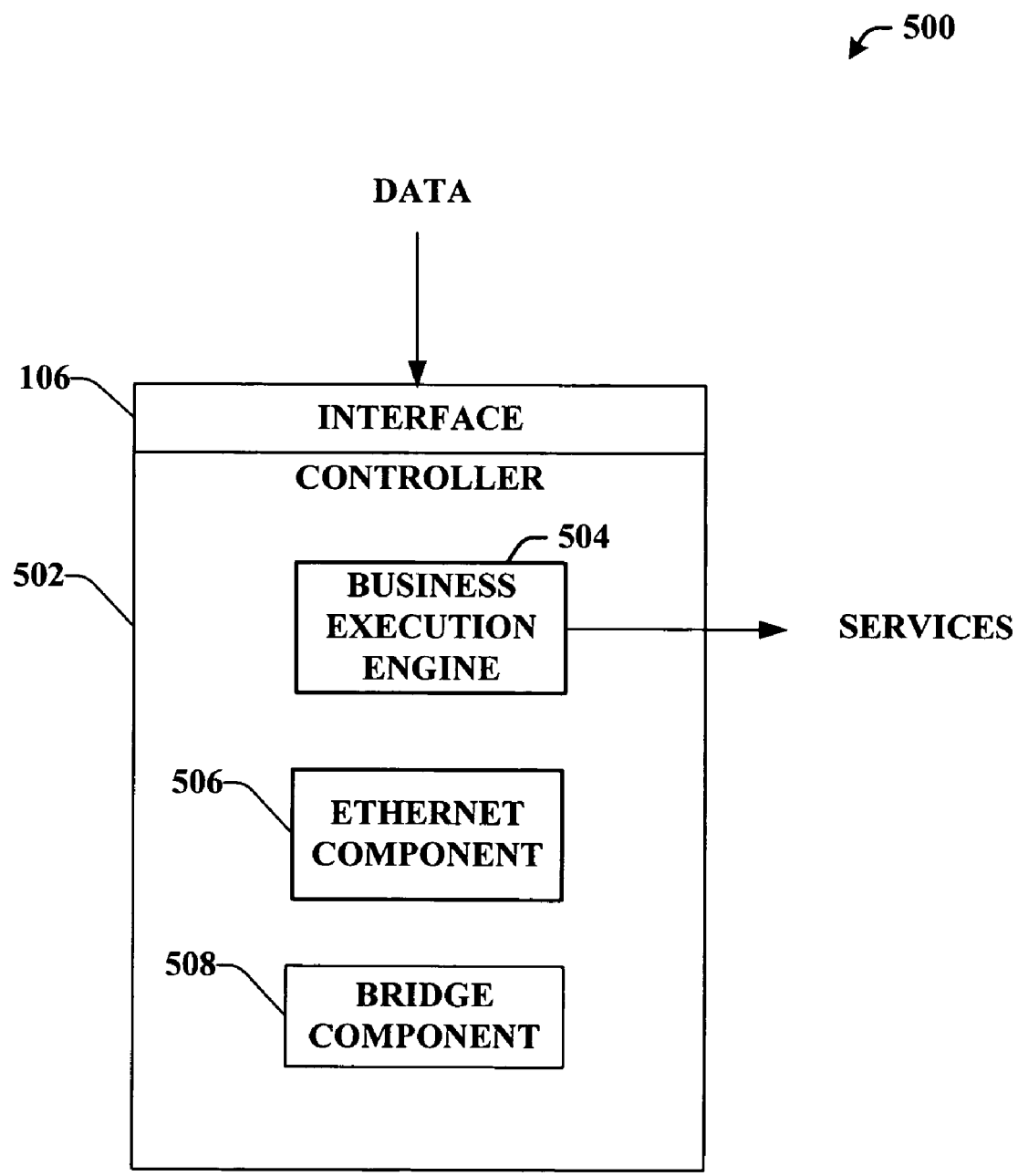
FIG. 5 illustrates a block diagram of an exemplary system that facilitates implementing a workflow within an industrial automation environment.

FIG. 5 illustrates a system 500 that facilitates implementing a workflow within an industrial automation environment. A controller 502 can integrate a business execution engine 504 to allow the seamless execution of any suitable workflow associated with the industrial automation environment. The business execution engine 504 can execute directly on the controller 502 to enable seamless data flow between multiple software applications running on the controller 502. With the aid of a hierarchically structured data model, the controller 502 with incorporated business execution engine 504 can utilize software applications to synthesize data from an industrial automation environment (e.g., a plant, a factory, a manufacturing facility, etc.) and affect transactions and/or services. It is to be appreciated that the controller 502 and the business execution engine 504 can be substantially similar to the controllers and engines described in previous figures The controller 502 can further include an Ethernet component 506 that facilitates executing workflow. In one example, the Ethernet component 506 can utilize a separate computer that executes the business process workflow engine and/or any other software programs to implement business processes. As discussed above, the business processes can be, but are not limited to being, a material tracking, a genealogy tracking, etc. The Ethernet component 506 can also facilitates data communication between other components, controllers, data stores, and/or any other suitable systems associated with the industrial automation environment.

The controller 502 can further include a bridge component 508 that facilitates networking within the industrial automation environment. In other words, the bridge component 508 can act as a network bridge. Thus, data carried by disparate networks can be manipulated so that it conforms to a common network. Accordingly, the bridge component 508 can recognize a network protocol associated with received instructions related to the controller 502 and perform operations to convert such data so that it conforms to a pre-defined protocol. Upon such conversion, a mapping can be employed to convert the data so that it conforms to the hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Profibus, Hart, Modbus, ASI-bus, and Foundation Fieldbus, while the second network protocol can be a Common Industrial Protocol (CIP).

Figure 6:
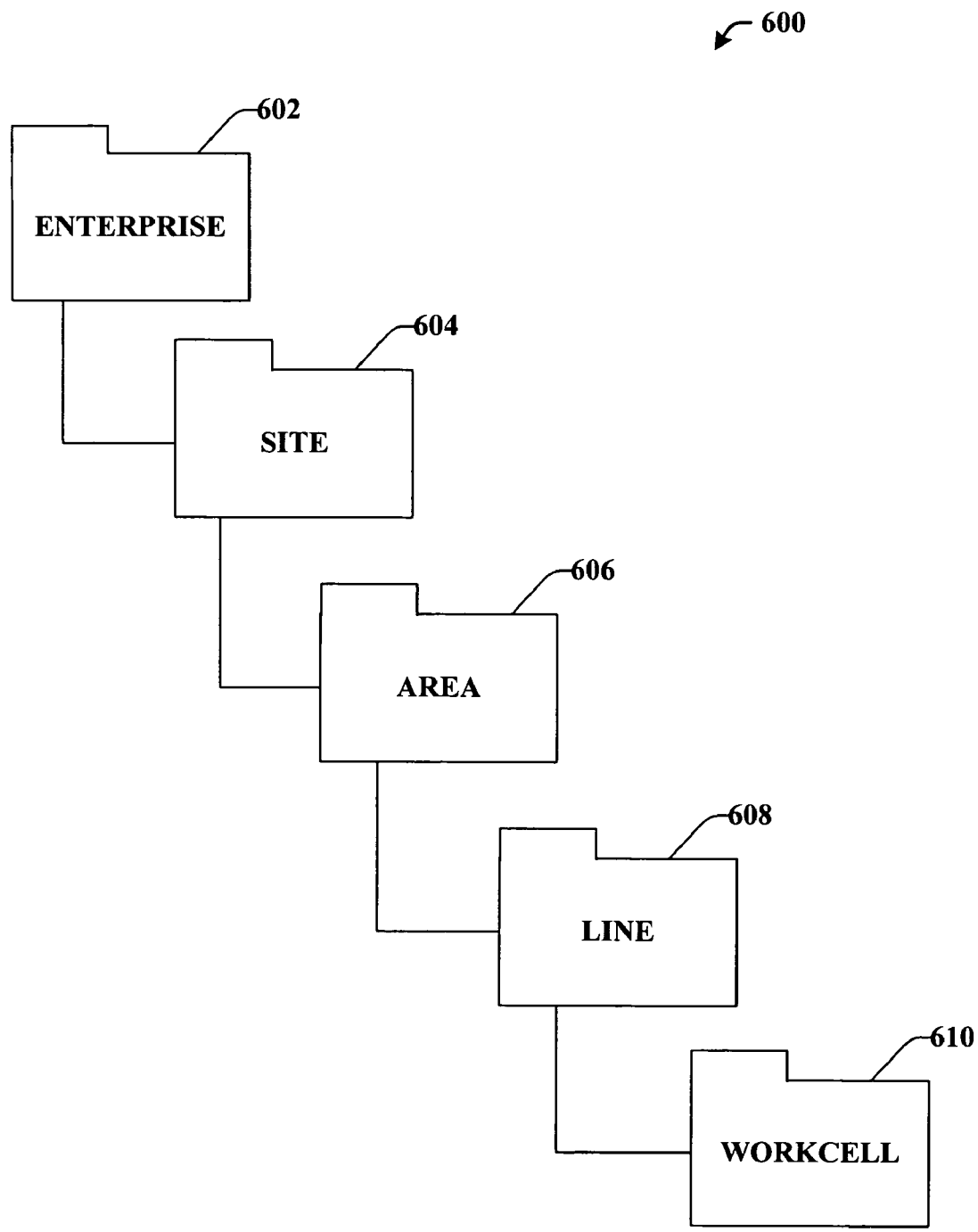
FIG. 6 illustrates a block diagram of an exemplary data structure that represents a hierarchical structure of an industrial automation system.

FIG. 6 illustrates a data structure 600 that represents a hierarchical structure of an industrial automation system. For example, the data structure can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs and/or controllers can become more aware of data associated therewith. Furthermore, the hierarchy 600 can be customized by an owner of such hierarchy. For instance, more granular objects/levels can be defined within the hierarchy 600.

Figure 7:
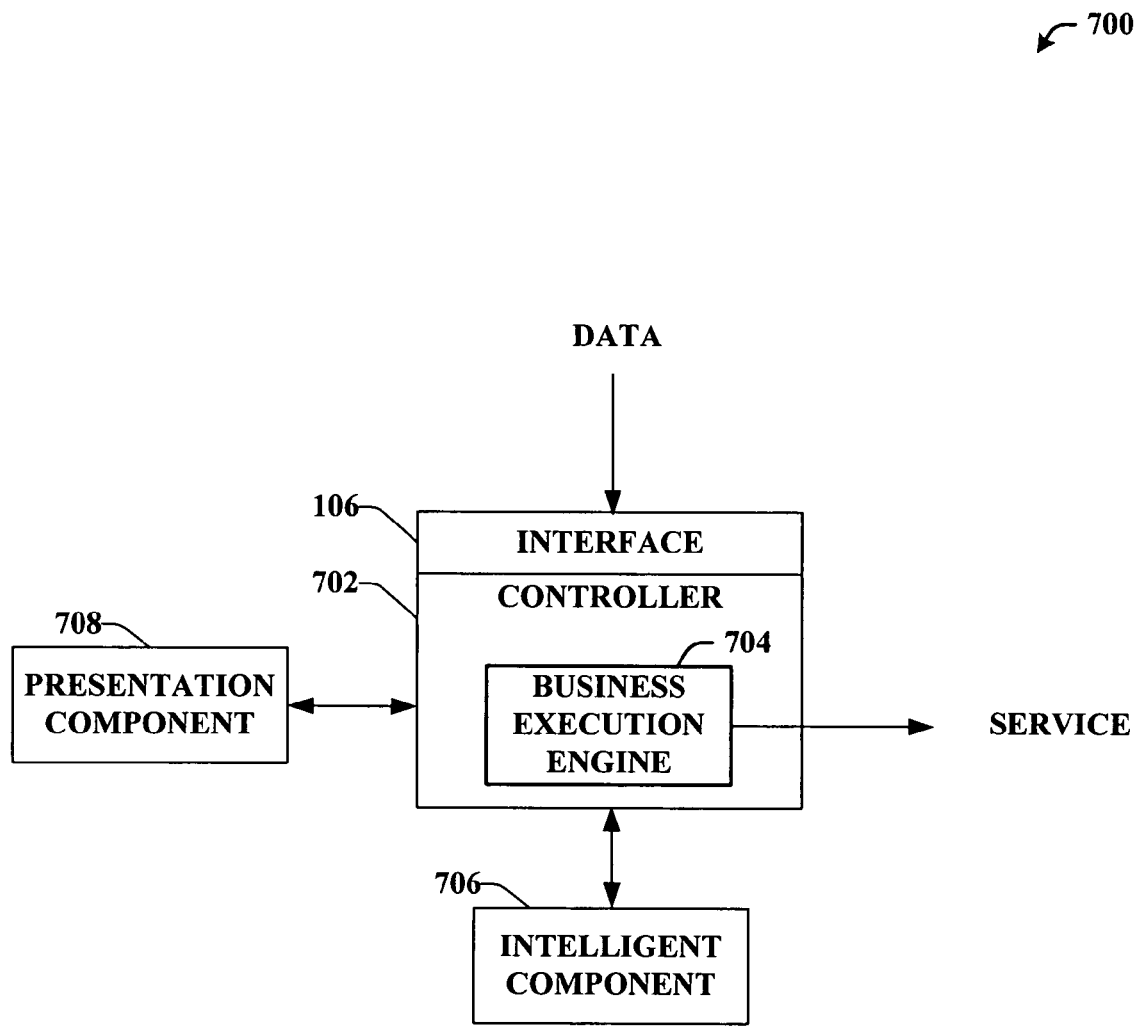
FIG. 7 illustrates a block diagram of an exemplary system that facilitates executing a business process workflow on a controller within an industrial automation environment to provide a service.

FIG. 7 illustrates a system 700 that employs intelligence to facilitate executing a business process workflow on a controller within an industrial automation environment to provide a service. The system 700 can include a controller 702, a business execution engine 704, and an interface 106 that can all be substantially similar to respective components, controllers, and interfaces described in previous figures. The system 700 further includes an intelligent component 706. The intelligent component 706 can be utilized by the controller 702 and/or the business execution engine 704 to facilitate executing a process workflow within an industrial automation environment. For example, the intelligent component 706 can infer workflow based on controller type, versioning related to workflow, tracking, genealogy, verification of services, etc.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 708 can provide various types of user interfaces to facilitate interaction between a user and any component coupled to the controller 702 and/or the business execution engine 704. As depicted, the presentation component 708 is a separate entity that can be utilized with the controller 702 and/or the business execution engine 704. However, it is to be appreciated that the presentation component 708 and/or similar view components can be incorporated into the controller 702, incorporated into the business execution engine 704 and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the controller 702 and/or the business execution engine 704.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
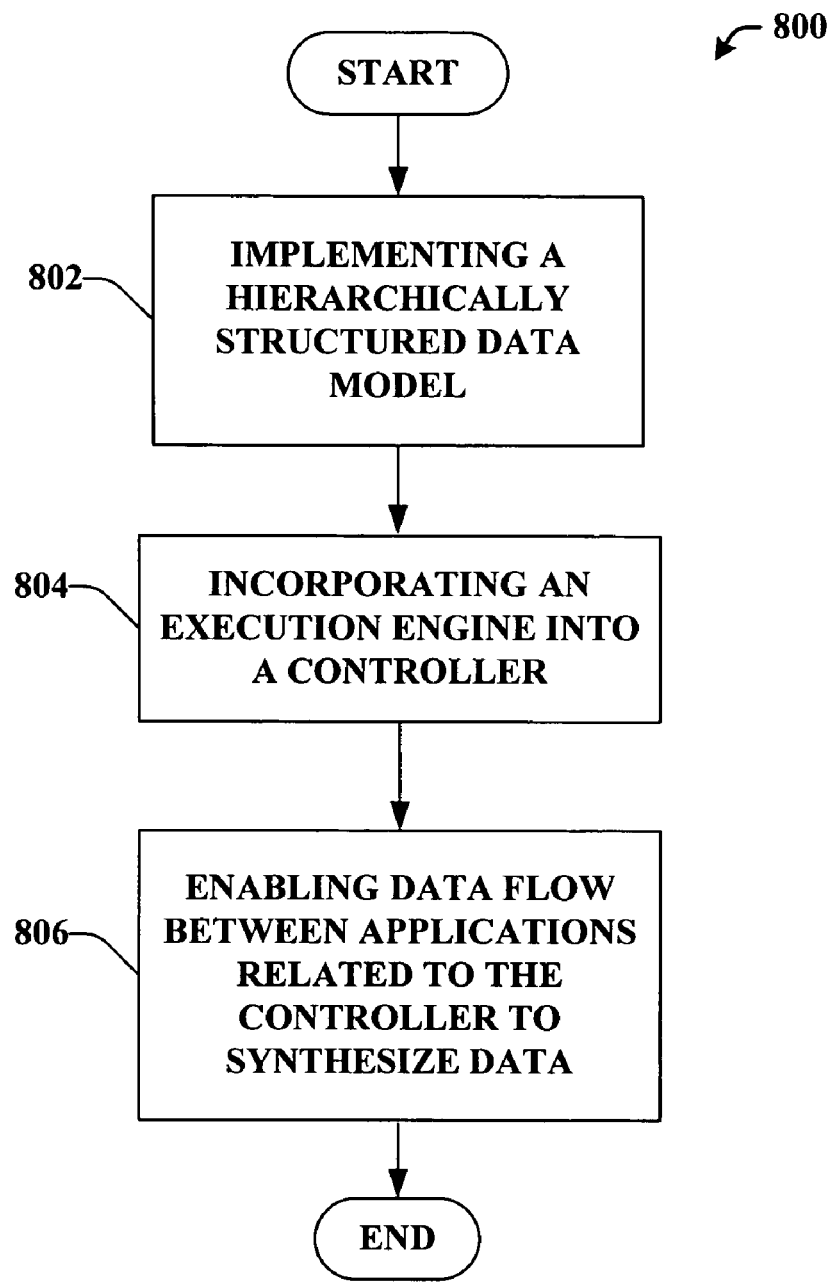
FIG. 8 illustrates an exemplary methodology for executing a business process workflow on a controller within an industrial automation environment to provide a service.
Figure 9:
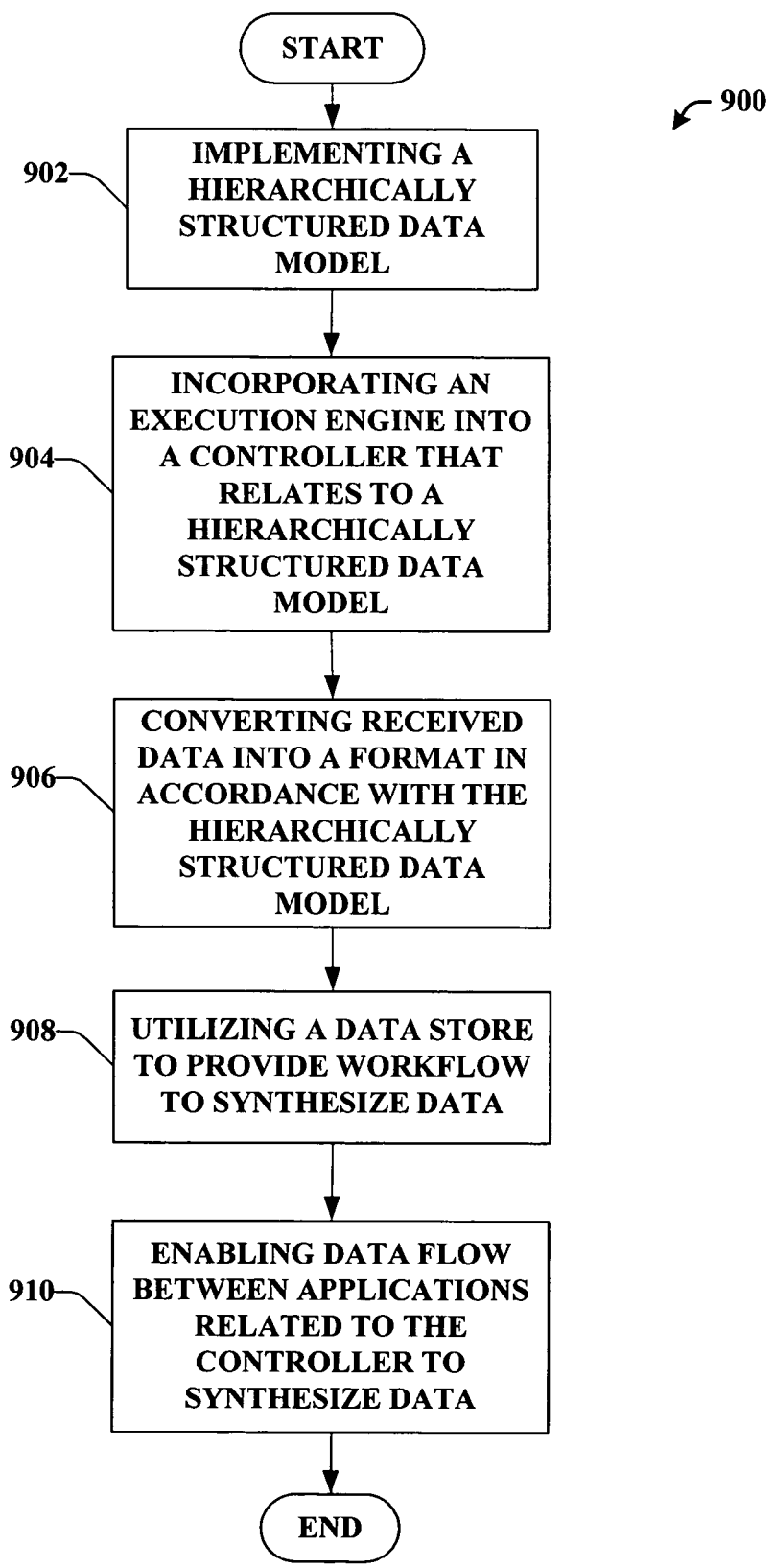
FIG. 9 illustrates an exemplary methodology that facilitates executing a business process workflow on a controller to enable data flow between multiple software applications to provide a plurality of services.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 is illustrated for executing a business process workflow on a controller within an industrial automation environment to provide a service. At reference numeral 802, a hierarchically structured data model can be implemented that utilizes a naming convention. The naming convention can represent a device and/or variable, wherein the representation of such device and/or variable includes the physical location within the industrial automation environment. It is to be appreciated that the device can be, but is not limited to, a roller, a station, a welder, a scanner, a belt conveyor, a pump, a press, a fan, etc., or any other suitable device utilized in automation systems. Furthermore, the device can be controlled by a controller. It is to be appreciated that the controller can contain software components and hardware components having inputs and/or outputs that can be utilized in connection with automating an industrial manufacturing device/process.

For example, the physical hierarchy of the industrial automation environment (FIG. 6) can be indicative of a factory-level, a cell-level, a subcell level, input and outputs within each subcell, and the like. Thus, the naming convention includes the physical hierarchy within the tag, reference and/or name of the device and/or logical variable. For example, a first photo eye on controller 5, in cell A, in the Smithville Plant that is for packaging associated with a Chip Factory can be referenced as "ChipFactory/Packaging/SmithvillePlant/CellA/Controller5/photoeye1."

At reference numeral 804, a controller can incorporate an execution engine. The controller can contain software components and hardware components having inputs and/or outputs that can be utilized in connection with automating an industrial manufacturing device/process. The controller can be associated with the physical location hierarchy of an industrial automation environment (e.g., a plant, factory, manufacturing facility, etc.). The physical location hierarchy of an industrial automation environment can be based at least in part upon the hierarchically structured data model. In one particular example, the hierarchical data model can be modeled after ISA_S88, ISAS95, and/or a combination thereof. It is understood, however, that any manner of hierarchically configuring a factory can be utilized in connection with modeling.

At reference numeral 806, the incorporated execution engine within the controller can enable seamless data flow between applications related to the controller allowing the synthesis of data within the industrial automation environment. The execution engine can execute directly on the controller to enable the data flow between multiple software applications running on such controller. The software applications related to the controller can synthesize data from the industrial automation environment (e.g., a plant, a factory, a manufacturing facility, etc.) and affect transactions and/or services. For instance, the transactions and/or services can be, but are not limited to, writing detailed process conditions, writing quality data associated with a batch of product to a database, logging computational errors associated with a process, tracking mechanical failure within a particular process, etc.

FIG. 9 illustrates a methodology 900 that facilitates executing a business process workflow on a controller to enable data flow between multiple software applications to provide a plurality of services. At reference numeral 902, a hierarchically structured data model can be implemented that utilizes a naming convention. The naming convention can represent a device and/or variable, wherein the representation of such device and/or variable includes the physical location within the industrial automation environment. For example, the physical hierarchy of the industrial automation environment can be indicative of a factory-level, a cell-level, a subcell level, input and outputs within each subcell, and the like. At reference numeral 904, a controller incorporates an execution engine, wherein the controller relates to the hierarchically structured data model (discussed supra).

At reference numeral 906, legacy data received can be converted into a format in accordance with the hierarchically structured data model that can be compatible with the controller. The data that can be formatted can be, but is not limited to programs, workflows, Business Process Execution Language (BPEL), etc. In one particular example, the common data model and/or hierarchical data model can be modeled after ISA_S88, ISAS95, and/or a combination thereof. It is understood, however, that any manner of hierarchically configuring a factory can be utilized in connection with modeling. Legacy data associated with legacy devices can be implemented in association with the controller and the execution engine to seamlessly execute business workflow. Referring to reference numeral 908, a data store can be utilized to provide workflow to synthesize data within the industrial automation environment. The data store can facilitate storing applications, modules associated with a particular functionality and other workflows associated with the industrial automation environment. For example, the data store 406 can be accessible via the Internet, Ethernet, and/or any other suitable data communication technique.

Continuing at reference numeral 910, the incorporated execution engine within the controller can enable seamless data flow between applications related to the controller allowing the synthesis of data within the industrial automation environment. The execution engine can execute directly on the controller to enable the data flow between multiple software applications running on such controller. The software applications related to the controller can synthesize data from the industrial automation environment (e.g., a plant, a factory, a manufacturing facility, etc.) and affect transactions and/or services. For instance, the transactions and/or services can be, but are not limited to, writing detailed process conditions, writing quality data associated with a batch of product to a database, logging computational errors associated with a process, tracking mechanical failure within a particular process, etc.

Figure 10:
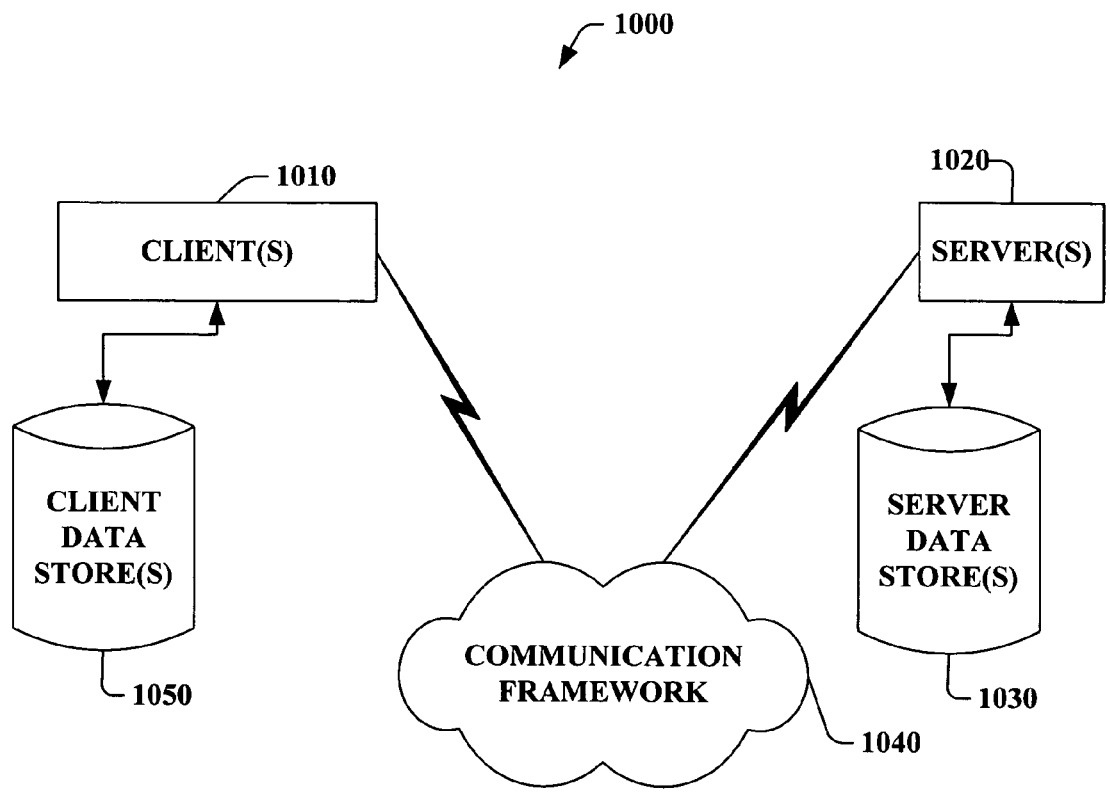
FIG. 10 illustrates an exemplary networking environment, wherein the novel aspects of the claimed subject matter can be employed.
Figure 11:
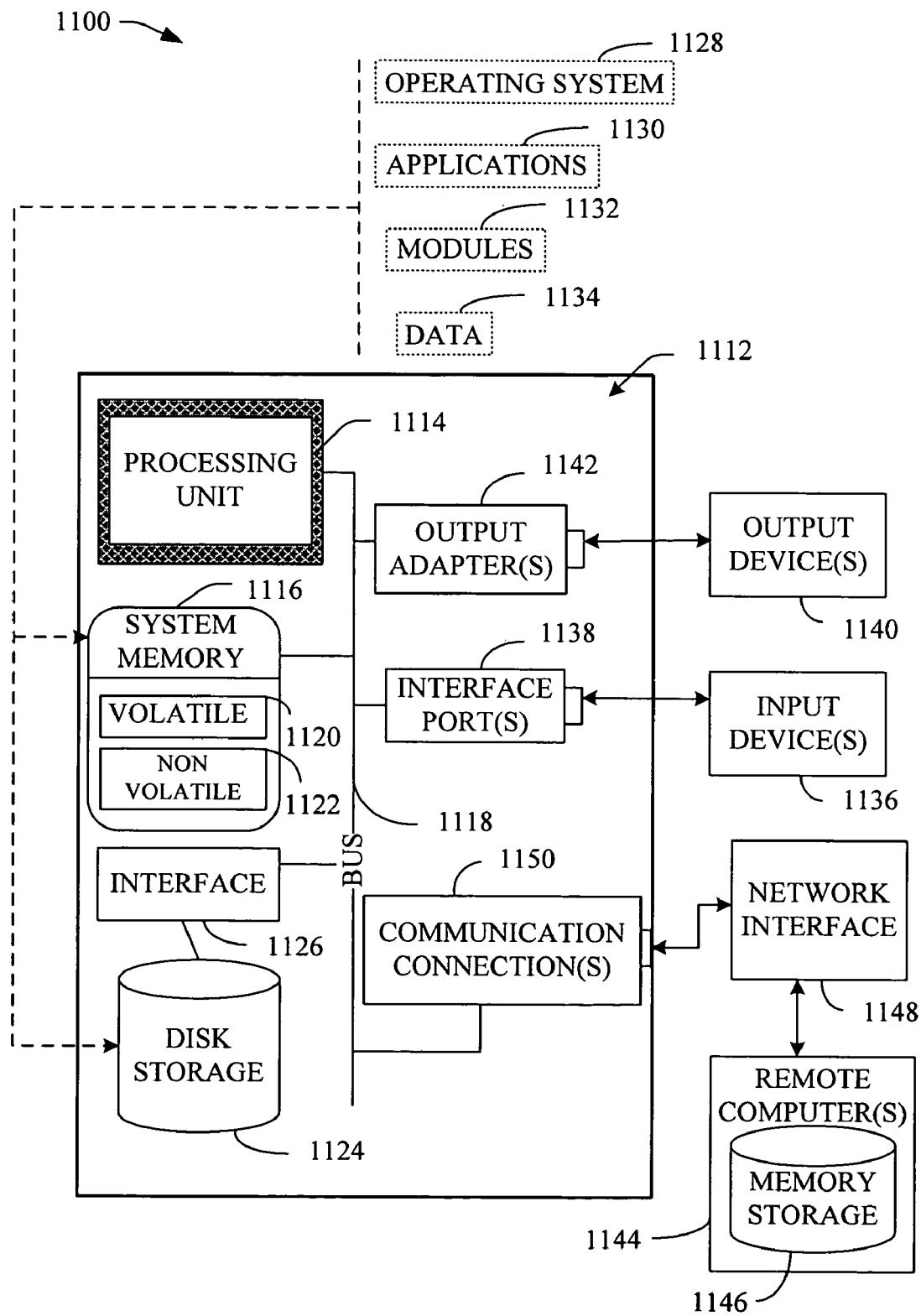
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE); VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the fiction in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An industrial controller, comprising the following components stored in computer memory and executable by a processor:
    an interface component that facilitates receipt of data associated with a workflow at the controller;
    an execution engine that executes the workflow; and
    a map component that interprets legacy data into a format that is compatible with the controller that relates to a hierarchically structured data model by using a naming convention based on the hierarchical structured data model to explicitly structure legacy data having an implicit physical hierarchical location of devices controlled by the industrial controller to manufacture a product in an industrial automation environment; and
    an intelligent component that facilitates executing the workflow based upon a probabilistic inference calculated by interpreting data captured by the controller and is configured to automatically initiate at least one action based on the inference.

2. The industrial controller of claim 1, the workflow is a business process execution language and initiates at least one of a service and a transaction that synthesizes data received from the controlled devices of the industrial automation environment.

3. The industrial controller of claim 2, the service further comprises providing a detailed process condition.

4. The industrial controller of claim 1, the hierarchically structured data model is based at least in part upon ISA S95®.

5. The industrial controller of claim 1, the hierarchically structured data model is based at least in part upon ISA_S88®.

6. The industrial controller of claim 1, the hierarchically structured data model is based at least in part upon a combination of ISA_S95® and ISA_S88®.

7. The industrial controller of claim 1, the hierarchically structured data model represents the physical hierarchical location within the industrial automation environment that includes at least one tag and a controlled device.

8. The industrial controller of claim 7, the physical hierarchical location of is indicative of at least a portion of a factory-level, a cell-level, a subcell level, an input within a subcell, and an output within a subcell.

9. The industrial controller of claim 7, the tag is at least one of a virtual input, a physical input, a virtual output, and a physical output related to the programmable logic controller.

10. The industrial controller of claim 7, the device is at least one of a roller, a station, a welder, a scanner, a belt conveyor, a pump, a press, a fan, and a photo eye.

11. The industrial controller of claim 1, the execution engine enables data flow between a plurality of software applications to synthesize data and affect at least one of a service and a transaction.

12. The industrial controller of claim 1, the map component interprets the hierarchically structured data model data into a legacy format that is compatible with at least one legacy device.

13. The industrial controller of claim 1, further comprising a bridge component that provides a first network protocol utilized to carry data from the programmable logic controller and configures the data for transmittal over a second network protocol.

14. The industrial controller of claim 13, the bridge component bridges multiple communication networks.

15. The industrial controller of claim 13, the first network protocol is one of Fieldbus®, Profibus®, Hart®, Modbus®, ASI-bus®, and Foundation Fieldbus®.

16. The industrial controller of claim 15, the second network protocol is Common Industrial Protocol (CIP®).

17. The industrial controller of claim 1, further comprising an Ethernet component that executes at least one of a process workflow engine and a business process.

18. A method that facilitates implementing a workflow, comprising:
implementing a hierarchically structured data model;
incorporating an execution engine into a controller;
converting legacy data into a format in accordance with the hierarchically structured data model by using a naming convention based on the hierarchical structured data model to explicitly structure legacy data in accordance with an implicit physical hierarchical location of devices controlled by the controller to manufacture a product in an industrial automation environment;
probabilistically inferring at least one user desire and automatic acting based on the at least one user desire; and
enabling seamless data flow between applications relations to the controller to synthesize data.

19. The method of claim 18, the hierarchically structured data model represents the physical hierarchical location within the industrial automation environment of at least one of a controlled device, a tag, and a variable.

20. The method of claim 18, the physical hierarchical location of is indicative of at least a portion of a factory-level, a cell-level, a subcell level, an input within a subcell, and an output within a subcell.

21. The method of claim 18, the hierarchically structured data model is based at least in part upon one or more of ISAS95® and ISA_S88®.

22. The method of claim 18, further comprising providing at least one of a bridge between at least two disparate networks and a mapping between disparate data.

23. The industrial controller utilized within an industrial automation environment, comprising the following components stored in computer memory and executable by a processor:
means for facilitating receipt of data associated with a workflow at the industrial controller;
means for converting legacy data into a format in accordance with the hierarchically structured data model by using a naming convention based on the hierarchical structured data model to explicitly structure legacy data in accordance with an implicit physical hierarchical location of devices controlled by the programmable logic controller to manufacture a product in an industrial automation environment;
means for probabilistically inferring an action to automatically perform based on user desires; and
means for incorporating an execution engine into the programmable logic controller that executes the workflow.

24. The industrial controller of claim 2, the service further comprises providing a quality data associated with a batch of product to a database.

25. The industrial controller of claim 2, the service further comprises logging a computational error associated with a process.

26. The industrial controller of claim 2, the service further comprises providing a detailed process condition tracking a mechanical failure within a particular process.

27. The industrial controller of claim 1, the intelligent component further comprises a classifier function that maps an input attribute to a confidence that the input belongs to a class where the classifier employs at least one of support vector machines (SVM), naïve Bayes, Bayesian belief networks, decision trees, neural networks, fuzzy logic models or data fusion engines.

28. The method of claim 18, the probabilistic inference is based on at least one observation captured as data from within the industrial automation environment where data can be derived from at least one data source.

* * * * *